(12) United States Patent
Kamioka et al.

(10) Patent No.: US 8,876,659 B2
(45) Date of Patent: Nov. 4, 2014

(54) ENGINE START CONTROL DEVICE (75) Inventors: Nozomu Kamioka, Chiyoda-ku (JP);
Shinji Watanabe, Chiyoda-ku (JP);
Kensuke Hayashi, Chiyoda-ku (JP);
Satoshi Wachi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 357 days.

(21) Appl. No.: 13/278,277

(22) Filed: Oct. 21, 2011

(65) Prior Publication Data

US 2012/0270700 A1 Oct. 25, 2012

(30) Foreign Application Priority Data

Apr. 21, 2011 (JP) ................. 2011-094832

(51) Int. Cl.
B60W 10/06 (2006.01)
F04B 49/02 (2006.01)
F02N 11/08 (2006.01)
F16H 61/00 (2006.01)
F02N 15/08 (2006.01)
F02D 41/02 (2006.01)

(52) U.S. Cl.
CPC ............... F04B 49/022 (2013.01); F02N 15/08 (2013.01); B60Y 2300/192 (2013.01); Y02T 10/48 (2013.01); B60Y 2300/18016 (2013.01); F02D 2250/28 (2013.01); F02N 11/0814 (2013.01); F02D 41/0215 (2013.01); F16H 61/0031 (2013.01); F02N 2200/041 (2013.01)
USPC .......................................................... 477/83

(58) Field of Classification Search
CPC ..... B60W 10/02; B60W 10/06; B60W 10/08; B60W 30/18018
See application file for complete search history.

(56) References Cited

U.S. PATENT DOCUMENTS 6,769,502 B2   8/2004  Nakamori et al.
2010/0241326 A1*  9/2010  Muranaka et al. ............... 701/58

FOREIGN PATENT DOCUMENTS

JP   2003-172444 A    6/2003
JP   4566083 B2      10/2010
JP   4576713 B2      11/2010

OTHER PUBLICATIONS

Japanese Office Action issued in Japanese Patent Application No. 2011-094832, mailed Jun. 19, 2012.

* cited by examiner

Primary Examiner — Robert A Siconolfi
Assistant Examiner — Huan Le
(74) Attorney, Agent, or Firm — Sughrue Mion, PLLC (57) ABSTRACT

An engine start control device includes a mechanical pump supplying hydraulic pressure; an electric pump connected in parallel to the mechanical pump and independently driven; a device for stopping the engine when an idling stop condition is satisfied and starting the engine when a restart condition and a fuel injection condition are satisfied; a device for driving the electric pump when the hydraulic pressure is less than a first hydraulic pressure when the engine is stopped by idling stop; and a device for driving a motor at a target speed and for performing control so that the change in the target speed is small compared with the change exhibited when the hydraulic pressure is equal or higher than a second hydraulic pressure, when the hydraulic pressure is less than the second hydraulic pressure, and the restart condition is satisfied after the idling stop.

24 Claims, 5 Drawing Sheets

ENGINE START CONTROL DEVICE

BACKGROUND OF THE INVENTION

1. Field of the Invention

The present invention relates to an engine start control device for a vehicle having an idling-stop function.

2. Description of the Related Art

An idling-stop vehicle stops fuel supply to an engine when predetermined idling-stop conditions are satisfied. Therefore, after an engine rotation speed is reduced, the idling-stop vehicle comes into an engine stall state. A mechanical oil pump, which rotates in synchronization with the engine, discharges a reduced amount when the engine rotation speed is reduced. As a result, a hydraulic pressure for bringing a forward clutch (hereinafter, referred to simply as "clutch") into engagement (hereinafter, referred to as "line pressure") is reduced. Thus, even when control is performed so that the clutch maintains the engaged state, the hydraulic pressure is not supplied to an automatic transmission and the clutch in the engine stall state. As a result, the clutch cannot maintain the engaged state any more. If the engine is restarted in the above-mentioned state, the line the pressure (hydraulic pressure of a hydraulic circuit) and the engagement/disengagement of the clutch cannot be controlled. Therefore, the clutch is suddenly brought into the engaged state with a sudden increase in line pressure. Accordingly, there is a problem of shock generation.

In order to prevent the shock generation, there is a control method of releasing the clutch during idling-stop, restarting the engine in a clutch-released state, and slowly bringing the clutch into the engaged state after complete combustion. According to the above-mentioned method, however, the vehicle can be only started after a predetermined time period from the complete combustion in the engine to the full engagement of the clutch after the complete combustion. Even when the above-mentioned time period in which the vehicle cannot be started is reduced, a feeling of discomfort of a driver cannot be eliminated.

In view of the problem described above, it is considered to reduce the time until the vehicle starts by starting the engine while the engaged state of the clutch is maintained. As described above, however, the hydraulic pressure is not supplied from the mechanical oil pump during the idling stop, and hence it is necessary to supply the hydraulic pressure by another means.

As a method of solving the problems described above, there has been proposed a method involving connecting an electric oil pump in parallel to the mechanical oil pump and driving the electric oil pump during the idling stop to supply the hydraulic pressure so as to maintain the engaged state of the clutch.

According to the above-mentioned method, it is considered as follows. If the system is configured to drive the electric oil pump during a time period in which the driving of the mechanical oil pump is stopped, the hydraulic pressure, which allows the engaged state to be maintained, can be ensured. In this manner, a driving time can be minimized to further reduce the amount of electric power consumption. However, the following is found. There is a time lag from the start of the driving of the electric oil pump to the sufficient increase of the line pressure. As a result, within a specific period of time after the satisfaction of idling stop conditions, the line pressure is disadvantageously reduced to such a degree that the engaged state of the clutch cannot be maintained. If an engine restart request is made in the above-mentioned specific period of time, the shock is generated.

Therefore, there exists a conventional engine start control device which has a predetermined time period in which the restart is inhibited after the start of driving of the electric oil pump in case of an insufficient line pressure for the engagement of the clutch at the time of restart (for example, Japanese Patent No. 4566083 (page 9, FIG. 5)).

There exists another conventional engine start control device which includes a hydraulic pressure sensor. After it is detected by the hydraulic pressure sensor that the line pressure is insufficient, the driving of the electric oil pump is started. The driving of the electric oil pump is controlled so as to maintain the hydraulic pressure necessary for the engagement of the clutch (for example, Japanese Patent No. 4576713 (page 18, FIG. 5)).

The conventional start control device described in Japanese Patent No. 4566083 cited above is configured so that the electric oil pump is driven after the mechanical oil pump is stopped and the restart is inhibited until the hydraulic pressure sufficient for the engagement of the clutch is ensured. According to the method described above, a predetermined time is required after the issuance of the restart request to enable the actual vehicle start as in the case of the conventional device described above. Therefore, there is a problem in that the driver experiences a feeling of discomfort.

The start control device, which has a configuration using the hydraulic pressure sensor to detect a reduction in hydraulic pressure so as to drive the electric oil pump, is proposed in Japanese Patent No. 4576713 cited above. If the configuration described above is employed while using the electric oil pump which has a high responsiveness and a large dischargeable amount, the reduction in line pressure can be reduced. Ability to supply the hydraulic pressure which can maintain the engagement of the clutch in a steady state is sufficient as general performance required for the electric oil pump. In addition, cost can be reduced in such a case. However, if the start control device is configured by using the electric oil pump having the minimal performance as described above, a certain length of time is required to increase the hydraulic pressure to a predetermined pressure by the electric oil pump. Therefore, there is a problem in that the hydraulic pressure for continuously maintaining the engagement of the clutch cannot be ensured.

It is then considered that unexpected release of the clutch due to a reduction in hydraulic pressure can be prevented by driving the electric oil pump at earlier timing even if the electric oil pump having the minimal performance is used. In the case where the electric oil pump having the minimal performance is used, however, the reduction in line pressure cannot be sufficiently prevented even when the driving of the electric oil pump is started at earlier timing. Moreover, a check valve is generally connected to an output side of the electric oil pump for the purpose of preventing a backflow from the mechanical oil pump. Thus, if the driving of the electric oil pump is started in a state in which the line pressure is high to such a degree that the check valve is not opened, a pressure in the electric oil pump is abnormally increased to result in a failure.

SUMMARY OF THE INVENTION

The present invention has been made to solve the problems described above, and therefore has an object to provide an engine start control device realized in small size at a low cost, which starts driving an electric oil pump during idling stop so as to enable a quick start of a vehicle without generating a shock even when a restart request is issued during a time period in which a clutch is placed in an unintended released state due to an insufficient line pressure.

According to the present invention, there is provided an engine start control device, including: a power transmission system including at least an engine provided with a motor for driving and a clutch to be hydraulically controlled; a mechanical oil pump provided on the power transmission system, for supplying a hydraulic pressure for hydraulic control; an electric oil pump connected in parallel to the mechanical oil pump to be independently driven; hydraulic pressure detection means for detecting the hydraulic pressure for the hydraulic control; idling stop control means for stopping the engine when a predetermined idling stop condition is satisfied and starting the engine when a predetermined restart condition and a predetermined fuel injection condition are satisfied; electric oil pump control means for driving the electric oil pump when the hydraulic pressure detected by the hydraulic pressure detection means is less than a first predetermined pressure during a time period in which the engine is stopped in a case of idling stop; and motor control means for driving the motor so that a rotation speed of the motor becomes identical with a target rotation speed and for performing control so that an amount of change in the target rotation speed becomes relatively small as compared with an amount of change exhibited in a case where the hydraulic pressure is equal to or higher than a second predetermined pressure when the hydraulic pressure is less than the second predetermined pressure in a case where the predetermined restart condition is satisfied after the idling stop.

According to the present invention, the engine start control device realized in small size at a low cost, which starts driving the electric oil pump during the idling stop so as to enable the quick start of the vehicle without generating the shock even when the restart request is issued during the time period in which the clutch is placed in the unintended released state due to the insufficient line pressure, can be provided.

DETAILED DESCRIPTION OF THE PREFERRED EMBODIMENT

An engine start control device according to the present invention includes: a power transmission system including at least an engine provided with a motor for driving and a clutch to be hydraulically controlled; a mechanical oil pump provided on the power transmission system, for supplying a hydraulic pressure for hydraulic control; an electric oil pump connected in parallel to the mechanical oil pump to be independently driven; hydraulic pressure detection means for detecting the hydraulic pressure for the hydraulic control; idling stop control means for stopping the engine when a predetermined idling stop condition is satisfied and starting the engine when a predetermined restart condition and a predetermined fuel injection condition are satisfied; electric oil pump control means for driving the electric oil pump when the hydraulic pressure detected by the hydraulic pressure detection means is less than a first predetermined pressure during a time period in which the engine is stopped in a case of idling stop; and motor control means for driving the motor so that a rotation speed of the motor becomes identical with a target rotation speed and for performing control so that an amount of change in the target rotation speed becomes relatively small as compared with an amount of change exhibited in a case where the hydraulic pressure is equal to or higher than a second predetermined pressure when the hydraulic pressure is less than the second predetermined pressure in a case where the predetermined restart condition is satisfied after the idling stop.

As a result, the electric oil pump and the motor can be controlled based on the detected hydraulic pressure. Therefore, a sudden increase in pressure can be prevented. The clutch, which is placed in an unintended released state due to an insufficient pressure, can be gradually brought into an engaged state. Therefore, a shock, which may otherwise be generated at the time of start of a vehicle, can be prevented. Moreover, the electric oil pump can be prevented from being actuated in a range where the electric oil pump is not required to operate, thereby reducing the waste of energy. Further, when the hydraulic pressure is reduced, a line pressure of a hydraulic pressure circuit can be gradually increased by the supply of the hydraulic pressure with the mechanical oil pump which uses a rotational force of the motor as power in addition to the supply of the hydraulic pressure with the electric oil pump.

Further, the second predetermined pressure is a lower limit value of a pressure at which the clutch can be brought into an engaged state. As a result, it is possible to know precisely whether the clutch is in the engaged state or the released state. Therefore, control for relatively reducing the amount of change in target rotation speed can be prevented from unnecessarily operating when the clutch is held in the engaged state.

Further, the first predetermined pressure is a maximum value of a pressure at which the electric oil pump can perform discharge. As a result, the electric oil pump operates only in a range where the pressure can be increased. Therefore, a driving time can be minimized.

Further, the first predetermined pressure is a maximum value of a pressure at which the electric oil pump can continuously perform discharge. As a result, even in the case where the driving of the electric oil pump is started in a state in which the line pressure is high to such a degree that a check valve connected to an output side of the electric oil pump is not opened, the occurrence of a case where a pressure in the electric oil pump is abnormally increased to result in a failure can be prevented.

Further, the first predetermined pressure is equal to or higher than the second predetermined pressure. As a result, the line pressure can be increased without fail by the electric oil pump to a pressure at which the clutch can be brought into the engaged state.

Further, the power transmission system includes a torque converter, and the engine start control device further includes control means for controlling the torque converter so as to prevent the torque converter from being placed in a lockup state at time of restart.

If the motor is to be driven in the lockup state, a load on a vehicle side is large. Therefore, the motor having a large rated output is required to be used. However, the configuration is changed as described above so that a torque amplification function by the torque converter is made to operate to drive the motor while the lockup state is released. Therefore, a motor having a small rated output can be used to configure the engine start control device. Moreover, the lockup state is not required to be maintained during the idling stop. Therefore, a load of the electric oil pump can be reduced to enable a reduction in size and capacity of the engine start control device.

Hereinafter, an engine start control device according to an embodiment of the present invention is described referring to the drawings. In each of the drawings, the same or equivalent parts are denoted by the same reference symbols, and the overlapping description thereof is herein omitted.

Embodiment 1

Figure 1:
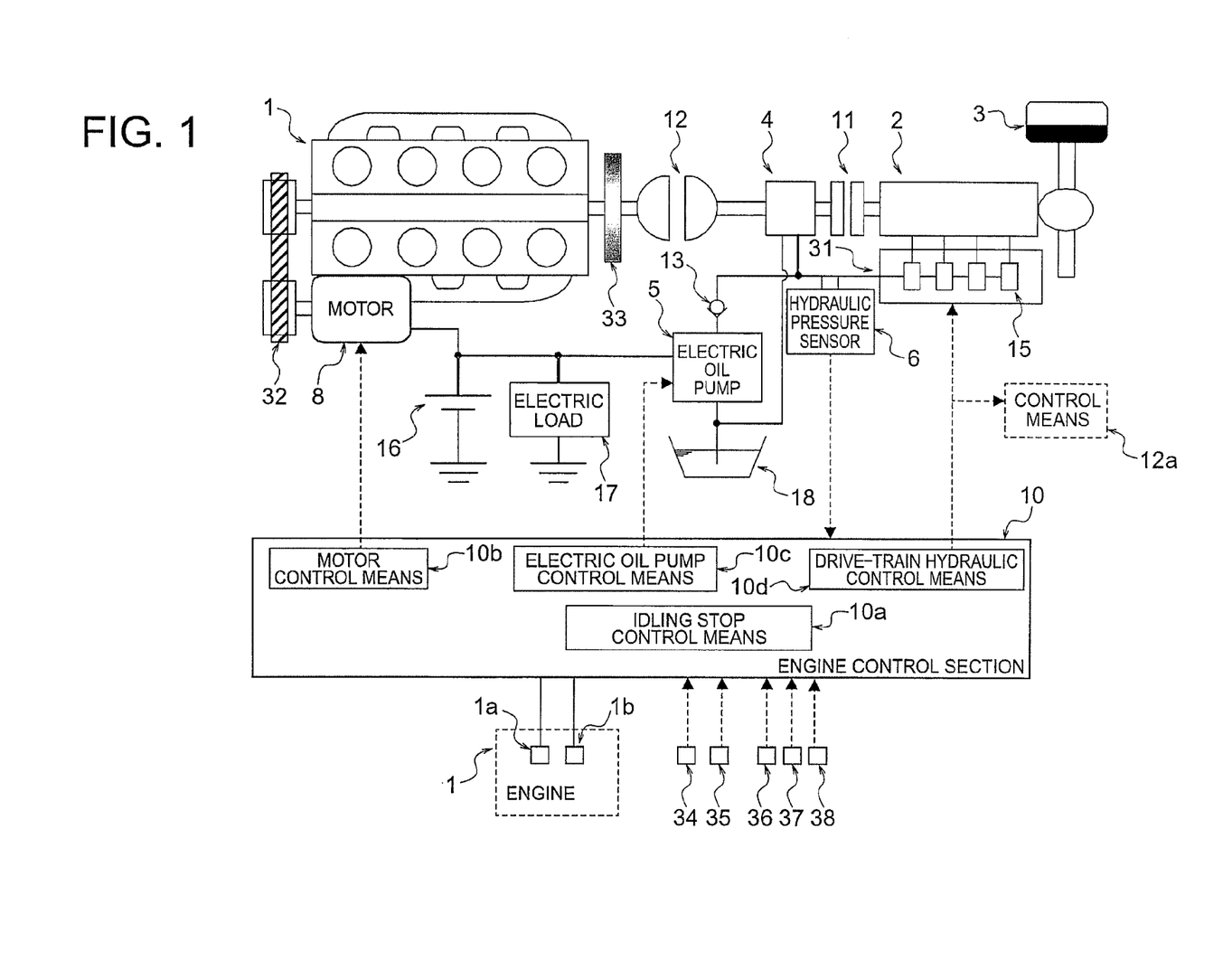
FIG. 1 is a diagram illustrating a configuration of an engine start control device according to an embodiment of the present invention.

FIG. 1 is a diagram illustrating a configuration of an engine start control device according to the embodiment of the present invention. A rotational force of an engine 1 transmitted to a tire 3 through a torque converter 12, a clutch 11, and an automatic transmission 2. A drive train section including the torque converter 12, the clutch 11, and the automatic transmission 2 is operated by a hydraulic pressure. Oil stored in an oil pan 18 is pumped up by a pump to supply a hydraulic pressure to a hydraulic circuit 31.

A hydraulic solenoid group 15 switches the hydraulic circuit 31 to operate a plurality of hydraulic actuators (not shown) for the automatic transmission 2, the clutch 11, and the torque converter 12 which constitutes the drive train. An engine control section 10 includes an electronic control unit and the like. The engine control section 10 includes drive-train hydraulic control means 10d corresponding to a constituent element of the engine control section 10. The drive-train hydraulic control means 10d operates the hydraulic solenoid group 15 to control the hydraulic pressure to be supplied to each of the hydraulic actuators to allow the drive train to perform an operation such as transmission/release of power and a gear shift.

Two types of oil pumps are connected in parallel to each other. One of the oil pumps is a mechanical oil pump 4 which is provided on a power transmission system series including the engine 1, a flywheel 33, the torque converter 12, the clutch 11, the automatic transmission 2, and the tire 3. The mechanical oil pump 4 rotates in synchronization with the engine 1. The other pump is an electric oil pump 5. The electric oil pump 5 can be supplied with electric power from a battery 16 to operate and can be operated independently of the mechanical oil pump 4. A check valve 13 prevents a backflow of the hydraulic pressure supplied by the mechanical oil pump 4 to the electric oil pump 5 while the operation of the electric oil pump 5 is stopped.

A hydraulic-pressure sensor (hydraulic-pressure detection means) 6 can detect the hydraulic pressure (line pressure) supplied to the hydraulic circuit 31. In a low hydraulic-pressure state, the hydraulic actuators cannot be operated. As a result, the drive train (the automatic transmission 2, the clutch 11, and the torque converter 12) cannot be controlled by the drive-train hydraulic control means 10d. Therefore, it is necessary to control the hydraulic pressure of the hydraulic circuit to an appropriate hydraulic pressure based on the results of detection of the hydraulic pressure sensor 6. Electric oil pump control means 10c is also a constituent element of the engine control section 10. The electric oil pump control means 10c sends a driving command to the electric oil pump 5 when it is determined based on the hydraulic pressure information detected by the hydraulic pressure sensor 6 and other information in the engine control section 10 that the electric oil pump 5 is required to be driven.

A motor 8 corresponds to a starter for the engine 1. An output shaft of the motor 8 is connected to the engine 1 through an intermediation of a belt 32. Motor control means 10b is a constituent element of the engine control section 10. The motor control means 10b determines based on signals from an accelerator pedal sensor 34 and a brake pedal sensor 35 whether or not restart is required. When predetermined restart conditions are satisfied, the motor control means 10b sends a driving command to the motor 8. Moreover, the motor control means 10b has a function of computing a target rotation speed of the motor 8 and calculates the target rotation speed according to the conditions. The motor control means 10b also has a rotation speed feedback function and calculates a target torque based on the calculated target rotation speed and an actual rotation speed detected from a motor rotation speed detector 38 for the motor 8 so as to command the motor 8 to generate the calculated target torque.

The battery 16 is supplied with electric power from a power generator (not shown) to be charged. The battery 16 supplies electric power to the motor 8, an electric load 17 for a vehicle, the electric oil pump 5, and the engine control section 10.

Idling stop control means 10a is a constituent element of the engine control section 10. When predetermined idling-stop conditions are satisfied, the idling stop control means 10a commands an injector 1a included in the engine 1 to stop fuel injection and a spark plug 1b to stop ignition so as to stop the engine 1. When the predetermined restart conditions and fuel injection conditions are satisfied, the idling stop control means 10a commands the injector 1a of the engine 1 to perform fuel injection and the spark plug 1b to perform ignition so as to start the engine 1.

The engine 1 illustrated in broken line in a lower part of FIG. 1 is the same as the engine 1 illustrated in an upper part of FIG. 1. The engine start control device also includes a vehicle velocity detector 36 for detecting a vehicle velocity, an engine rotation speed detector 37 for detecting a rotation speed of the engine 1, and the motor rotation speed detector 38 for detecting a rotation speed of the motor 8. Any one of the engine rotation speed detector 37 and the motor rotation speed detector 38 may be omitted because the motor 8 and the engine 1 rotate in synchronization with each other. Alternatively, the vehicle velocity, the engine rotation speed, and the motor rotation speed may be obtained not only from the detectors described above but also from other types of detectors (not shown). Further alternatively, the vehicle velocity, the engine rotation speed, and the motor rotation speed may be obtained from detection values of other detector(s) based on a predetermined computation. Further alternatively, the vehicle velocity, the engine rotation speed, and the motor rotation speed may be obtained from existing information used for normal engine control in the engine control section 10 or by a computation or the like from the information.

Figure 2:
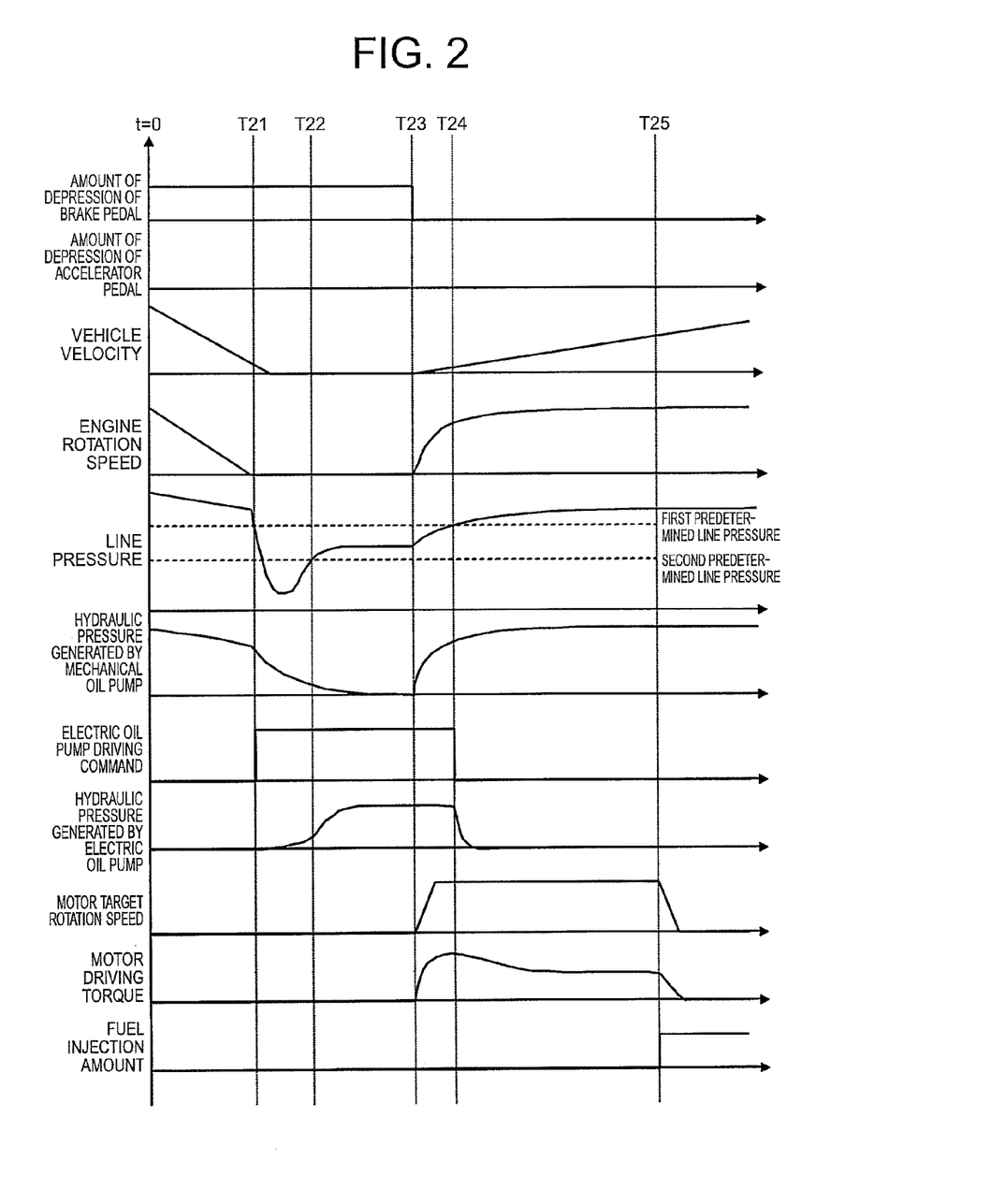
FIG. 2 is a timing chart illustrating an operation of each section performed when normal control is performed by the engine start control device according to the present invention.

Next, an operation performed in the case where the restart request is made when the hydraulic pressure of the hydraulic circuit is high and the clutch 11 is held in the engaged state in the engine start control device illustrated in FIG. 1 is described. FIG. 2 is a timing chart illustrating an operation of each section of the engine start control device illustrated in FIG. 1. In FIG. 2, the horizontal axis indicates time, whereas the vertical axis indicates a change in each factor. Here, description is given by assuming that the predetermined restart condition is the release of a brake pedal during idling stop. For easy understanding and simplification of the description, it is assumed that a first predetermined line pressure is set to a maximum value of a pressure which can be output from the electric oil pump 5 and a second predetermined line pressure is set to a lower limit value of the pressure at which the clutch 11 can be brought into the engaged state. The first predetermined line pressure is, for example, equal to or higher than the second predetermined line pressure.

In an initial state in which t=0, the brake pedal is depressed and therefore, the vehicle is in a decelerating state. The line pressure corresponding to the hydraulic pressure of the hydraulic circuit 31 is higher than the second predetermined line pressure corresponding to the line pressure which is required for the engagement of the clutch 11, and therefore the engaged state of the clutch 11 is maintained. The tire 3 is rotated by a road surface (because the vehicle has not completely stopped yet). The engine 1 and the mechanical oil pump 4 also rotate in synchronization. At this point of time, the predetermined idling stop conditions (for example, the vehicle velocity obtained from the vehicle velocity detector 36 is less than a predetermined velocity, for example, 5 km/h, and the amount of depression of the brake pedal obtained from the brake sensor 35 is a predetermined value or larger) are satisfied. Thus, the idling stop control means 10*a* performs control so as to stop the engine 1. The drive-train hydraulic control means 10*d* controls the hydraulic solenoid group 15 so as to release the lockup state of the torque converter 12.

At t=T21, the rotation of the engine 1 is already in a stop state. Therefore, the hydraulic pressure generated by the mechanical oil pump 4 gradually reduces. When the line pressure becomes less than the first predetermined line pressure, the electric oil pump control means 10*c* commands the driving of the electric oil pump 5. When the driving of the electric oil pump 5 is started, the line pressure starts gradually increasing.

In a time period from t=T21 to t=T22, the line pressure temporarily becomes lower than the second predetermined line pressure. The reason of the temporary reduction in line pressure is because it takes time until the line pressure is actually increased after the start of driving of the electric oil pump 5. During this time period, the clutch 1 is placed in an unintended released state.

At t=T22, the hydraulic pressure generated by the electric oil pump 5 increases to be equal to or higher than the second predetermined line pressure. Therefore, the clutch 11 is brought into the engaged state again.

At t=T23, the driver releases the brake pedal. Thus, the above-mentioned predetermined restart condition is satisfied. As a result, the motor control means 10*b* computes the target rotation speed and commands the motor 8 to generate a driving torque based on the results of computation. The rotation speed of the motor 8 gradually increases, and the rotation speed of the engine 1 also increases in synchronization with the increase in motor rotation speed. The line pressure is higher than the second predetermined line pressure, and therefore the engaged state of the clutch 11 is maintained. A driving force of the motor 8 is transmitted to the tire 3 through the drive train (the automatic transmission 2, the clutch 11, and the torque converter 12). As a result, the vehicle velocity increases.

At t=T24, with the increase in hydraulic pressure by the mechanical oil pump 4 which rotates in synchronization with the rotation speed of the engine 1, the line pressure exceeds the first predetermined line pressure. Therefore, the electric oil pump control means 10*c* commands the electric oil pump 5 to stop the driving thereof. Subsequently, the hydraulic pressure generated by the electric oil pump 5 gradually reduces.

At t=T25, the predetermined fuel injection conditions (for example, the above-mentioned restart condition is satisfied, and the engine 1 is in a state in which the rotation speed of the engine 1 obtained from the engine rotation speed detector 37 is equal to or larger than a predetermined rotation speed) are satisfied. Therefore, the idling stop control means 10*a* allows the fuel injection and ignition to be started. The motor control means 10*b* gradually reduces the target rotation speed to stop the driving of the motor 8.

Figure 3:
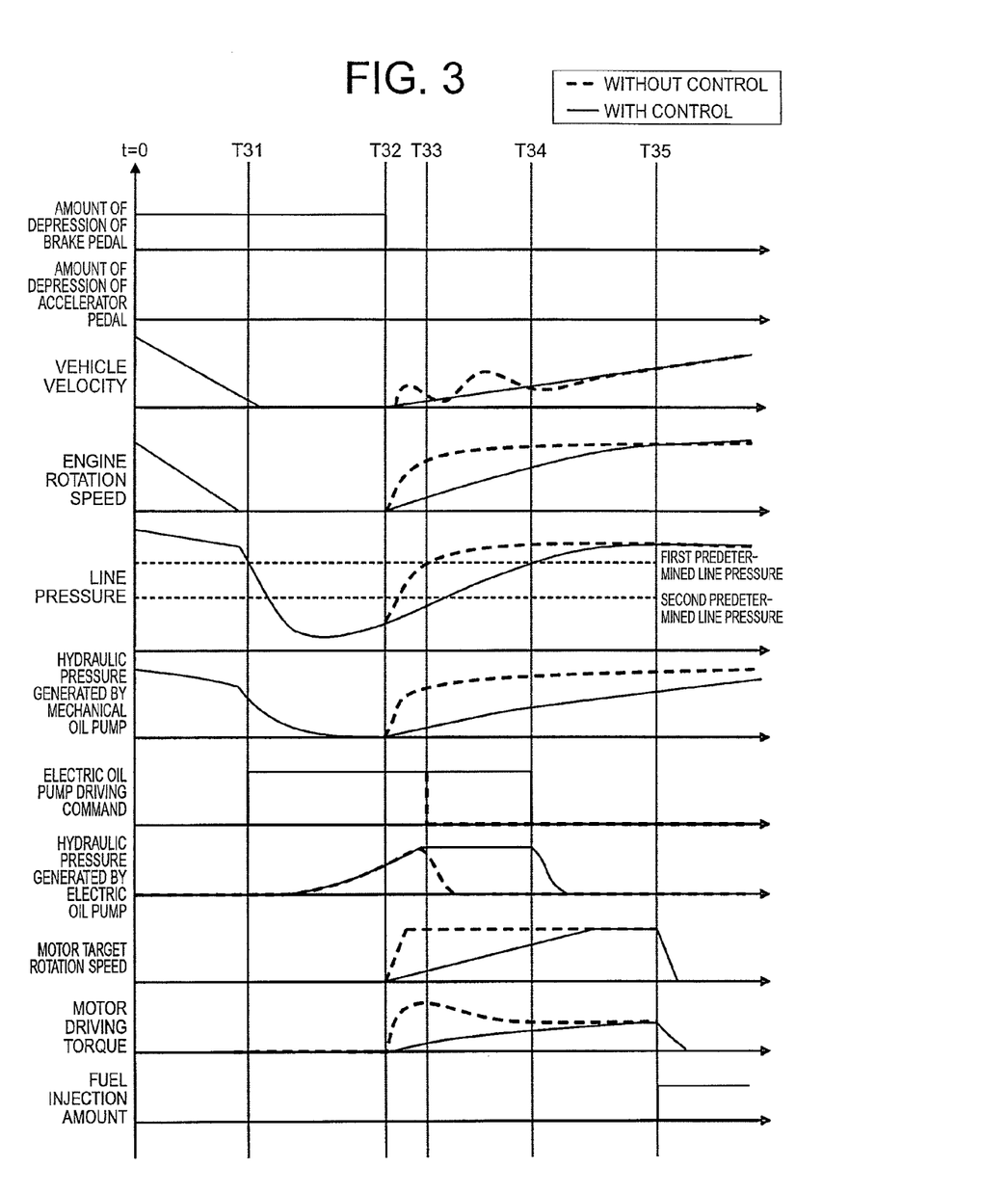
FIG. 3 is a timing chart illustrating an operation of each section performed when control is performed at a low hydraulic pressure by the engine start control device according to the present invention.

Next, an operation performed in the case where the restart request is made when the hydraulic pressure of the hydraulic circuit is low and therefore, the clutch 11 is placed in the unintended released state in the engine start control device illustrated in FIG. 1 is described. FIG. 3 is a timing chart illustrating an operation of each section of the engine start control device illustrated in FIG. 1. In FIG. 3, the horizontal axis indicates time, whereas the vertical axis indicates a change in each factor. A behavior exhibited in the case where the shock is generated is indicated by the dot line, whereas a behavior exhibited in the case where the shock is not generated by introducing the control of the present invention is indicated by the solid line. For the part of the graph in which the dot line is not drawn, the behavior is the same as that indicated by the solid line.

First, the behavior exhibited in the case where the restart request is made when the clutch 11 is placed in the unintended released state to result in the generation of a shock is described.

In an initial state in which t=0, the brake pedal is depressed and therefore, the vehicle is in a decelerating state. The line pressure is higher than the second predetermined line pressure corresponding to the line pressure which is required for the engagement of the clutch 11, and therefore the engaged state of the clutch 11 is maintained. The tire 3 is rotated by a road surface (because the vehicle has not completely stopped yet). The engine 1 and the mechanical oil pump 4 also rotate in synchronization. At this point of time, the predetermined idling stop conditions (for example, the vehicle velocity obtained from the vehicle velocity detector 36 is less than the predetermined velocity, for example, 5 km/h, and the amount of depression of the brake pedal obtained from the brake sensor 35 is the predetermined value or larger) are satisfied. Thus, the idling stop control means 10*a* performs control so as to stop the engine 1. The drive-train hydraulic control means 10*d* controls the hydraulic solenoid group 15 so as to release the lockup state of the torque converter 12.

At t=T31, the rotation of the engine 1 is already in a stop state. Therefore, the hydraulic pressure generated by the mechanical oil pump 4 gradually reduces. When the line pressure becomes less than the first predetermined line pressure, the electric oil pump control means 10*c* commands the driving of the electric oil pump 5. When the driving of the electric oil pump 5 is started, the line pressure starts gradually increasing.

After a time period from t=T31, the line pressure temporarily becomes lower than the second predetermined line pressure. The reason of the temporary reduction in line pressure is because it takes time until the line pressure is actually increased after the start of driving of the electric oil pump 5. During this time period, the clutch 1 is placed in an unintended released state.

At t=T32, the driver releases the brake pedal. Thus, the above-mentioned predetermined restart condition is satisfied. As a result, the motor control means 10*b* computes the target rotation speed and commands the motor 8 to generate a driving torque based on the results of computation. The rotation speed of the motor 8 gradually increases, and the rotation speed of the engine 1 also increases in synchronization with the increase in motor rotation speed. At a timing at which the line pressure exceeds the second predetermined line pressure, the clutch 11 is brought into the engaged state. A driving force of the motor 8 is transmitted to the tire 3 through the drive train (the automatic transmission 2, the clutch 11, and the torque converter 12). As a result, the vehicle velocity increases.

The circumstances at this time are described in detail. In the state in which the clutch 11 is released, the motor 8 is driven in an extremely low mechanical load state as viewed from the engine 1 side. As a result, the rotation speed of the engine 1 suddenly increases. The line pressure in such a case is increased by both the electric oil pump 5 and the mechanical oil pump 4. Therefore, as compared with the case where the line pressure is increased by the electric oil pump 5 alone, the line pressure steeply rises. Immediately after the steep rise, the line pressure becomes equal to or higher than the second predetermined line pressure to suddenly bring the clutch 11 into the engaged state. As a result, the vehicle velocity vibrationally changes to result in the generation of a shock.

At t=T33, the line pressure exceeds the first predetermined line pressure. Therefore, the electric oil pump control means 10*c* commands the electric oil pump 5 to stop the driving thereof. As a result, the driving of the electric oil pump 5 is stopped.

At t=T35, the predetermined fuel injection conditions (for example, the above-mentioned restart condition is satisfied, and the engine 1 is in a state in which the rotation speed of the engine 1 obtained from the engine rotation speed detector 37 is equal to or larger than the predetermined rotation speed) are satisfied. Therefore, the idling stop control means 10*a* allows the fuel injection and ignition to be started. The motor control means 10*b* gradually reduces the target rotation speed to stop the driving of the motor 8.

Next, a behavior exhibited in the case where the restart request is made when the clutch 11 is placed in the unintended released state and the shock is not generated by introducing the control of the present invention is described.

The behavior from t=0 in the initial state to t=T31 is the same as that of the case where the shock is generated.

At t=T32, the driver releases the brake pedal. Therefore, the above-mentioned predetermined restart condition is satisfied. As a result, the motor control means 10*b* computes the target rotation speed and commands the motor 8 to generate the driving torque based on the results of computation. At this time, the motor control means 10*b* detects that the clutch 11 is not in the engaged state because the line pressure is less than the second line pressure. Therefore, the method of computing the target rotation speed is switched to that used when the clutch 11 is placed in the released state. Specifically, the amount of change in target rotation speed is set so as to be relatively smaller as compared with the case where the line pressure at the time of issuance of the restart request is equal to or higher than the second predetermined line pressure. By the setting described above, the target rotation speed is controlled so as to have a smaller gradient. Then, the motor control means 10*b* commands the motor 8 to generate the driving torque based on the results of computation.

The rotation speed of the motor 8 gradually increases. The rotation speed of the engine 1 also increases in synchronization with the increase in motor rotation speed. At a timing at which the line pressure exceeds the second predetermined line pressure, the clutch 11 is brought into the engaged state. The driving force of the motor 8 is transmitted to the tire 3 through the drive train (the torque converter 12, the clutch 11, and the automatic transmission 2). Therefore, the vehicle velocity increases.

The line pressure obtained in this case is increased by both the electric oil pump 5 and the mechanical oil pump 4. However, the line pressure increases relatively slowly because the control is performed so as to gradually increase the engine rotation speed. The speed of increase in line pressure is high as compared with the case where the line pressure is increased by the electric oil pump 5 alone. However, as compared with the case where the shock is generated, the line pressure can be raised slowly. In the process of the increase of the engine rotation speed, the line pressure becomes equal to or higher than the second predetermined line pressure. Therefore, the clutch 11 is slowly brought into the engaged state. As a result, the shock, which may otherwise be generated at the time of engagement of the clutch, is not generated.

At t=T34, the line pressure exceeds the first predetermined line pressure. Therefore, the electric oil pump control means 10*c* commands the electric oil pump 5 to stop the driving thereof. As a result, the driving of the electric oil pump 5 is stopped.

At t=T35, the predetermined fuel injection conditions (for example, the above-mentioned restart condition is satisfied, and the engine 1 is in a state in which the rotation speed of the engine 1, which is obtained from the engine rotation speed detector 37, is equal to or larger than the predetermined rotation speed) are satisfied, the idling stop control means 10*a* starts the fuel injection and ignition. The motor control means 10*b* gradually reduces the target rotation speed to stop the driving of the motor 8.

Next, an operation of the engine control section 10 in the operation illustrated in the timing chart described above is described referring to flowcharts. The overall processing is described referring to a flowchart of FIG. 4. Target rotation speed computation processing included in the overall processing is described in detail referring to a flowchart of FIG. 5.

Figure 4:
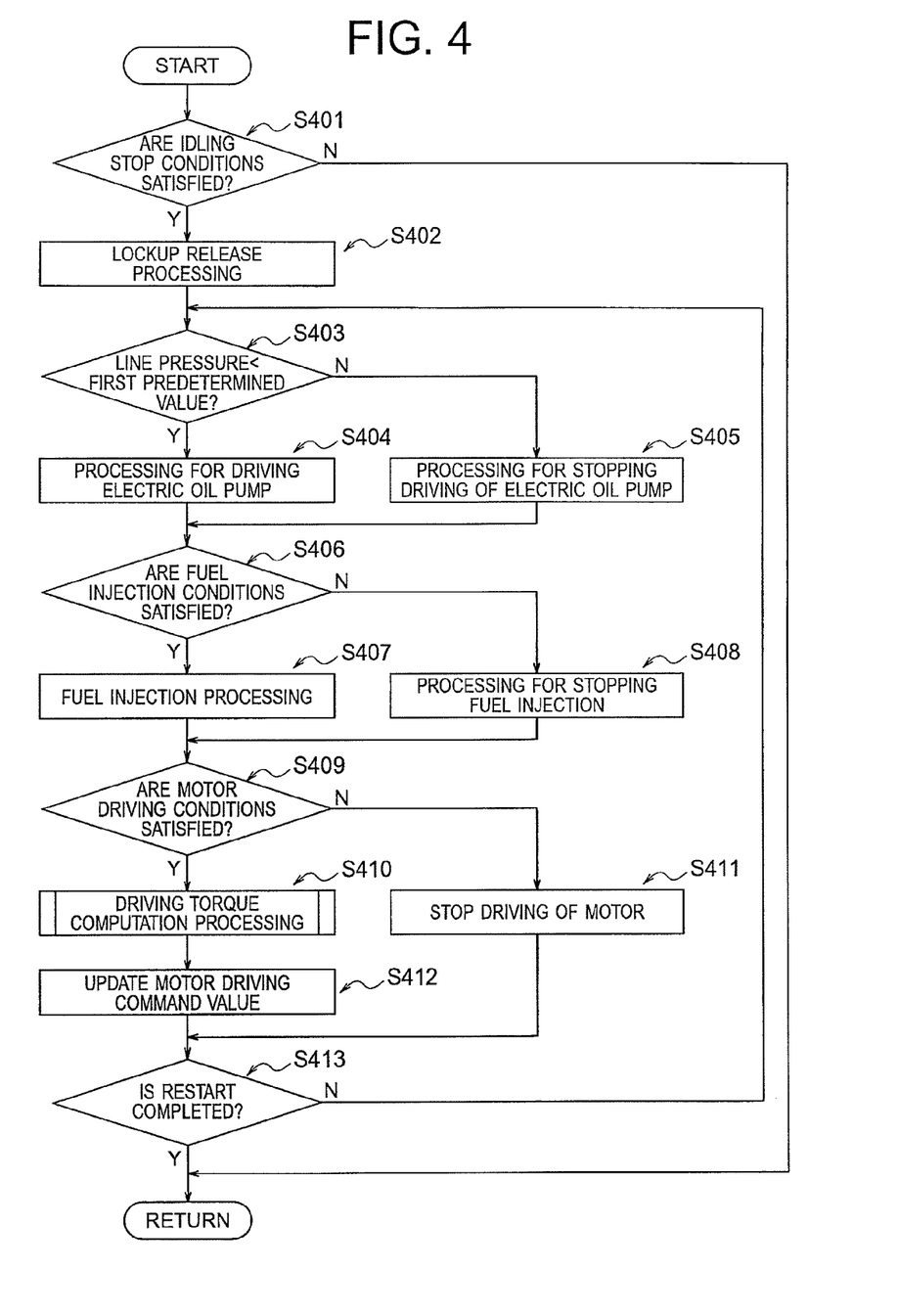
FIG. 4 is a flowchart of an operation of the engine start control device according to the present invention.

FIG. 4 is a flowchart illustrating the operation of the engine control section 10 in the operation illustrated in the timing chart described above. In the flowchart of FIG. 4, corresponding processing is performed in the order in which conditions of Steps S401, S403, S406, and S409 are satisfied. Therefore, parts of the processing are not always executed in the order of arrangement of steps.

In Step S401, the idling stop control means 10*a* determines whether or not the idling stop conditions are satisfied. When the idling stop conditions are satisfied, the processing proceeds to Step S402. When the idling stop conditions are not satisfied, the routine is terminated. The routine is repeatedly performed. The idling stop herein means an operation series from the stop of the engine 1 by the stop of the fuel injection as a result of satisfaction of the idling stop conditions to the restart of the engine 1 in response to the restart request. As an example of the idling stop conditions, the vehicle velocity less than 5 km/h and the amount of depression of the brake pedal equal to or larger than the predetermined value are given.

In Step S402, lockup release processing for the torque converter 12 is performed by the drive-train hydraulic control means 10*d*. Then, the processing proceeds to Step S403.

In Step S403, the electric oil pump control means 10*c* determines from the output of the hydraulic pressure sensor 6 whether or not the line pressure is less than the first predetermined line pressure. When the line pressure is less than the first predetermined line pressure, the processing proceeds to Step S404 where processing for driving the electric oil pump 5 is performed. On the other hand, when the line pressure is equal to or higher than the first predetermined line pressure, the processing proceeds to Step S405 where processing for stopping the driving of the electric oil pump 5 is performed. As a set value of the first predetermined line pressure, for example, the maximum value of the pressure which can be output from the electric oil pump 5 or the maximum value of the pressure at which the electric oil pump 5 can continuously perform discharge is used.

In Step S406, the idling stop control means 10a determines whether or not the fuel injection conditions are satisfied. When the predetermined fuel injection conditions are satisfied, the processing proceeds to Step S407 where fuel injection processing is performed. On the other hand, when the predetermined fuel injection conditions are not satisfied, the processing proceeds to Step S408 where the fuel injection is stopped. The predetermined fuel injection conditions are, for example, the satisfaction of the restart condition and the rotation speed of the engine 1 equal to or larger than the predetermined rotation speed. In the case where the state transits from the idling state to the idling stop state or in the case where a fuel injection stop state at the time of deceleration is maintained, it is determined that the predetermined fuel injection conditions are not satisfied. Therefore, the fuel injection stop processing is similarly performed in Step S408.

In Step S409, the motor control means 10b determines whether or not motor driving conditions are satisfied. When the motor driving conditions are satisfied, the processing proceeds to Step S410 where the motor is driven. On the other hand, when the motor driving conditions are not satisfied, the processing proceeds to Step S411 where the driving of the motor is stopped. The motor driving conditions are, for example, before the elapse of a predetermined time from the detection of the release of the brake pedal during the idling stop, and before the fuel injection or before the elapse of a predetermined time after the fuel injection.

In Step S410, the driving torque (target torque) for the motor 8 is computed in the motor control means 10b. Then, the processing proceeds to Step S412. The details of the contents of the computation are described below referring to FIG. 5. In Step S412, the motor control means 10b commands the motor 8 to generate the driving torque computed in Step S410. Then, the processing proceeds to Step S413. When the motor driving conditions are satisfied in Step S409 for the first time, the driving of the motor 8 is started in Step S412.

In Step S413, the idling stop control means 10a determines whether or not the restart from the idling stop state is completed. When it is determined that the restart is completed, the predetermined routine is terminated. On the other hand, when it is determined that the restart is not completed, the processing proceeds to Step S403. As restart completion determination conditions, the stop of the driving of the motor, self-rotation of the engine 1 by the fuel injection, and the like are given.

Figure 5:
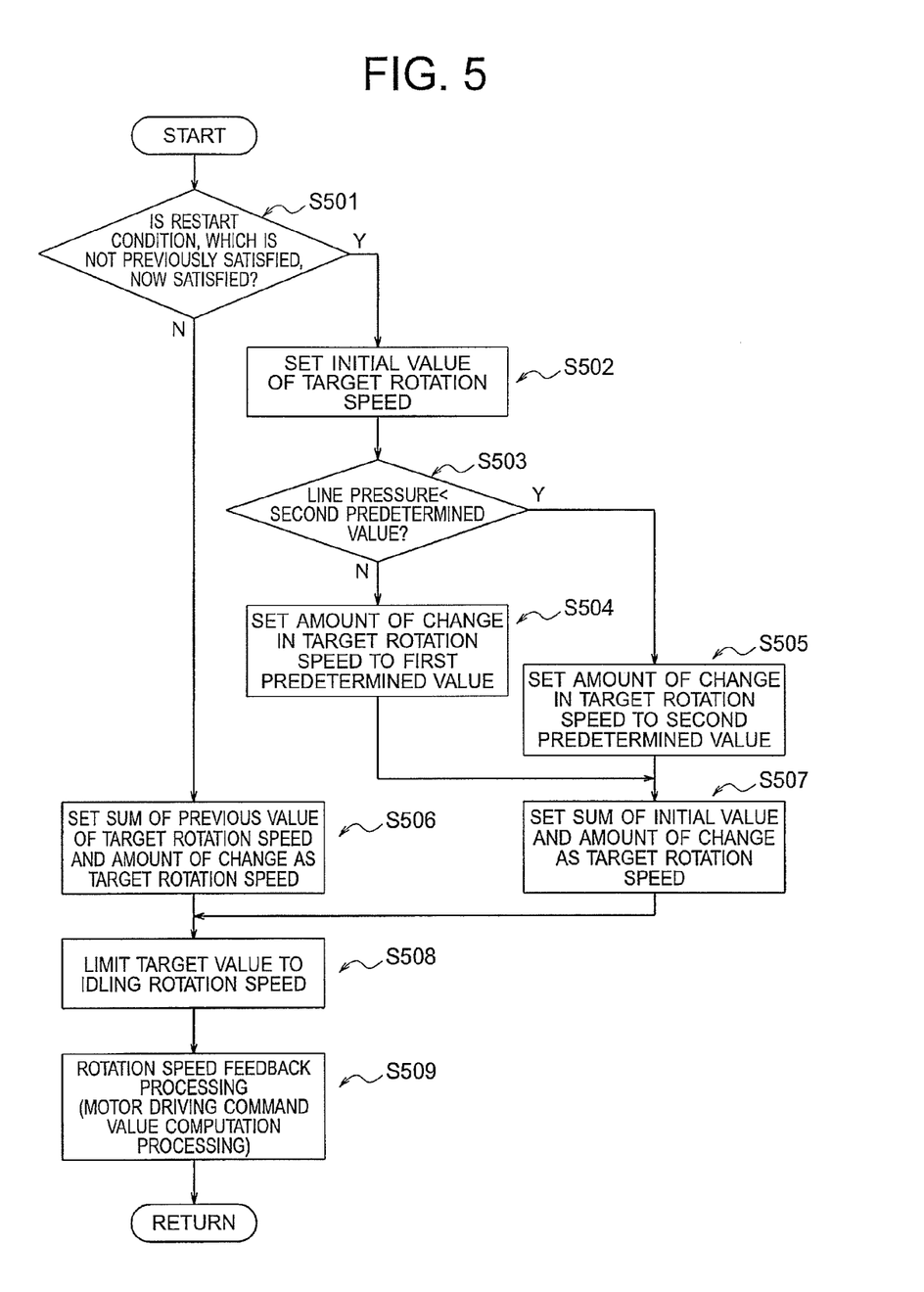
FIG. 5 is a flowchart of an operation of driving torque computation processing illustrated in FIG. 4.

FIG. 5 is a flowchart illustrating a detailed operation performed in the driving torque computation processing in Step S410 of FIG. 4, which is performed in the motor control means 10b of the engine control section 10. In Step S501, it is determined whether or not the restart condition, which is not previously satisfied, is now satisfied. When it is determined that the restart condition is not satisfied in the previous determination and it is determined that the restart condition is satisfied in the current determination, the processing proceeds to Step S502. When the result of the previous determination and the result of the current determination are not different from each other, the processing proceeds to Step S506.

In step S502, an initial value of the target rotation speed is set. Then, the processing proceeds to Step S503.

In Step S503, it is determined whether or not the line pressure is less than the second predetermined line pressure. When the line pressure is equal to or higher than the second predetermined line pressure, the processing proceeds to Step S504. On the other hand, when the line pressure is less than the second predetermined line pressure, the processing proceeds to Step S505. A set value of the second predetermined line pressure is, for example, the lower limit value of the pressure at which the clutch 11 can be brought into engagement.

In Step S504, the amount of change in target rotation speed is set to the first predetermined value. Then, the processing proceeds to Step S507.

In Step S505, the amount of change in target rotation speed is set to the second predetermined value which is smaller than the first predetermined value. Then, the processing proceeds to Step S507.

In Step S506, the target rotation speed is computed. Then, the processing proceeds to Step S508. The target rotation speed is set to the sum of a previous value of the target rotation speed and the amount of change in target rotation speed. In Step S507, the target rotation speed is computed. Then, the processing proceeds to Step S508. The target rotation speed is set to the sum of the initial value of the target rotation speed and the amount of change in target rotation speed.

In Step S508, the target rotation speed is limited to an upper limit value. Then, the processing proceeds to Step S509. The upper limit value of the target rotation speed is, for example, an idling rotation speed.

In step S509, target rotation speed feedback processing is performed. Then, the sub-routine is terminated. The target rotation speed feedback processing is realized by, for example, PID control and corresponds to processing for calculating the target torque from the target rotation speed and the actual rotation speed.

The motor used in the present invention is described mainly for the driving operation to be performed by the starter. However, any configuration may be used as long as the engine can be externally rotated. The motor may be a generator motor and therefore, is not limited to that of the embodiment described above.

For the type of the motor, not only a belt-type motor but also a general gear-type starter motor may be used.

The electric circuit according to the present invention may have any configuration as long as the electric power can be supplied to the motor and the electric oil pump. Therefore, a power converter may be connected between the battery and the motor or between the battery and the electric oil pump. Alternatively, batteries for respectively supplying the electric power to the motor and to the electric oil pump may be provided independently of the battery for supplying electric power to the vehicle electric load 17. Therefore, the electric circuit is not limited to that of the embodiment described above.

The mechanical oil pump according to the present invention has a configuration in which the mechanical oil pump is connected to the output shaft side of the torque converter. However, the mechanical oil pump may have any configuration as long as the mechanical oil pump is provided on the axis of the power transmission system from the engine to the tire. For example, the mechanical oil pump may be provided to the input side of the torque converter. Therefore, the configuration of the mechanical oil pump is not limited to that of the embodiment described above.

Further, for the position at which the check valve according to the present invention is connected, the check valve is provided on the output side of the electric oil pump in the embodiment described above. However, the check valve may be provided at any position as long as a hydraulic pressure higher than needed is not applied to the electric oil pump. Therefore, the position of the check valve is not limited to that of the embodiment described above.

Further, the present invention can be applicable to a device which does not have a configuration in which the automatic transmission and the torque converter are hydraulically controlled along with the clutch. In this case, for example, a command signal for the lockup release processing for the torque converter is output from the drive-train hydraulic control means 10d to another control means (see the control means 12a illustrated in FIG. 1) which controls the torque converter.

What is claimed is:

1. An engine start control device, comprising:
   a power transmission system including at least an engine provided with a motor for driving and a clutch to be hydraulically controlled;
   a mechanical oil pump provided on the power transmission system, for supplying a hydraulic pressure for hydraulic control;
   an electric oil pump connected in parallel to the mechanical oil pump to be independently driven;
   hydraulic pressure detection means for detecting the hydraulic pressure for the hydraulic control;
   idling stop control configured to, with a predetermined idling stop condition satisfied, stop the engine, and with a predetermined restart condition and a predetermined fuel injection condition satisfied, start the engine;
   electric oil pump control means for driving the electric oil pump, with the hydraulic pressure detected by the hydraulic pressure detection being less than a first predetermined pressure during a time period in which the engine is stopped in a case of idling stop; and
   motor control means for driving the motor so that a rotation speed of the motor becomes identical with a calculated target rotation speed,
   wherein, after the idling stop, with the predetermined restart condition satisfied, the motor control means sets the amount of change in the calculated target rotation speed to a first predetermined value, with the hydraulic pressure being greater than or equal to a second predetermined pressure,
   wherein, after the idling stop, with the predetermined restart condition satisfied, the motor control means sets the amount of change in the calculated target rotation speed to a second predetermined value with the hydraulic pressure being less than the second predetermined pressure, and
   wherein the first predetermined value is greater than the second predetermined value.

2. The engine start control device according to claim 1, wherein the power transmission system includes a torque converter, the engine start control device further comprising control means for controlling the torque converter so as to prevent the torque converter from being placed in a lockup state at time of restart.

3. The engine start control device according to claim 1, wherein the first predetermined pressure is equal to or higher than the second predetermined pressure.

4. The engine start control device according to claim 3, wherein the power transmission system includes a torque converter, the engine start control device further comprising control means for controlling the torque converter so as to prevent the torque converter from being placed in a lockup state at time of restart.

5. The engine start control device according to claim 1, wherein the first predetermined pressure comprises a maximum value of a pressure at which the electric oil pump can continuously perform discharge.

6. The engine start control device according to claim 5, wherein the first predetermined pressure is equal to or higher than the second predetermined pressure.

7. The engine start control device according to claim 6, wherein the power transmission system includes a torque converter, the engine start control device further comprising control means for controlling the torque converter so as to prevent the torque converter from being placed in a lockup state at time of restart.

8. The engine start control device according to claim 5, wherein the power transmission system includes a torque converter, the engine start control device further comprising control means for controlling the torque converter so as to prevent the torque converter from being placed in a lockup state at time of restart.

9. The engine start control device according to claim 1, wherein the first predetermined pressure comprises a maximum value of a pressure at which the electric oil pump can perform discharge.

10. The engine start control device according to claim 9, wherein the first predetermined pressure is equal to or higher than the second predetermined pressure.

11. The engine start control device according to claim 10, wherein the power transmission system includes a torque converter, the engine start control device further comprising control means for controlling the torque converter so as to prevent the torque converter from being placed in a lockup state at time of restart.

12. The engine start control device according to claim 9, wherein the power transmission system includes a torque converter, the engine start control device further comprising control means for controlling the torque converter so as to prevent the torque converter from being placed in a lockup state at time of restart.

13. The engine start control device according to claim 1, wherein the second predetermined pressure comprises a lower limit value of a pressure at which the clutch can be brought into an engaged state.

14. The engine start control device according to claim 13, wherein the power transmission system includes a torque converter, the engine start control device further comprising control means for controlling the torque converter so as to prevent the torque converter from being placed in a lockup state at time of restart.

15. The engine start control device according to claim 13, wherein the first predetermined pressure is equal to or higher than the second predetermined pressure.

16. The engine start control device according to claim 15, wherein the power transmission system includes a torque converter, the engine start control device further comprising control means for controlling the torque converter so as to prevent the torque converter from being placed in a lockup state at time of restart.

17. The engine start control device according to claim 13, wherein the first predetermined pressure comprises a maximum value of a pressure at which the electric oil pump can continuously perform discharge.

18. The engine start control device according to claim 17, wherein the power transmission system includes a torque converter, the engine start control device further comprising control means for controlling the torque converter so as to prevent the torque converter from being placed in a lockup state at time of restart.

19. The engine start control device according to claim 17, wherein the first predetermined pressure is equal to or higher than the second predetermined pressure.

20. The engine start control device according to claim 19, wherein the power transmission system includes a torque converter, the engine start control device further comprising control means for controlling the torque converter so as to prevent the torque converter from being placed in a lockup state at time of restart.

21. The engine start control device according to claim 13, wherein the first predetermined pressure comprises a maximum value of a pressure at which the electric oil pump can perform discharge.

22. The engine start control device according to claim 21, wherein the first predetermined pressure is equal to or higher than the second predetermined pressure.

23. The engine start control device according to claim 22, wherein the power transmission system includes a torque converter, the engine start control device further comprising control means for controlling the torque converter so as to prevent the torque converter from being placed in a lockup state at time of restart.

24. The engine start control device according to claim 21, wherein the power transmission system includes a torque converter, the engine start control device further comprising control means for controlling the torque converter so as to prevent the torque converter from being placed in a lockup state at time of restart.

* * * * *